United States Patent [19]

Walbe

[11] 4,098,015
[45] Jul. 4, 1978

[54] RETRIEVER TRAINING GUN WITH PISTOL TYPE HANDLE

[76] Inventor: Andrew W. Walbe, 2207 Irene Dr., La Marque, Tex. 77568

[21] Appl. No.: 782,452

[22] Filed: Mar. 29, 1977

[51] Int. Cl.² .............................................. F41C 3/00
[52] U.S. Cl. ..................................... 42/1 F; 42/71 P
[58] Field of Search ............... 42/1 F, 1 R, 1 L, 71 P, 42/72, 71 R, 74; 89/1 G

[56] References Cited

U.S. PATENT DOCUMENTS

| | | | |
|---|---|---|---|
| 3,004,360 | 10/1961 | Johnson | 42/1 F |
| 3,186,119 | 6/1965 | Maras et al. | 42/1 F |
| 3,415,438 | 12/1968 | DeCaro | 42/1 R |
| 3,505,926 | 4/1970 | Johnson | 42/1 F |
| 3,534,492 | 10/1970 | Amster | 42/1 F |
| 3,623,257 | 11/1971 | Ray | 42/71 R |
| 3,656,399 | 4/1972 | Hill | 42/1 F |
| 3,672,084 | 6/1972 | Pachmayr | 42/71 P |

Primary Examiner—Charles T. Jordan
Attorney, Agent, or Firm—B. P. Fishburne, Jr.

[57] ABSTRACT

To avoid bruising the hand due to recoil forces and to provide a steadier aiming grip on retriever dog training projectile guns of the dual or single projectile types, a padded pistol type hand grip is securely attached to a commercial type projectile gun or thrower without the need for altering or defacing the commercial structure.

5 Claims, 4 Drawing Figures

U.S. Patent   July 4, 1978   4,098,015
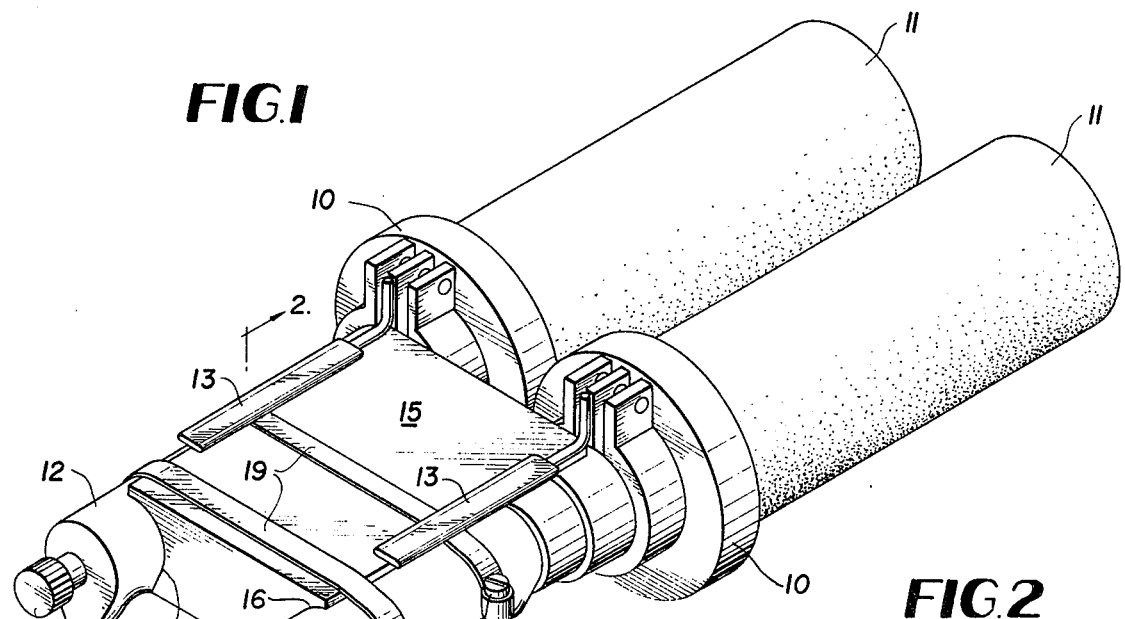
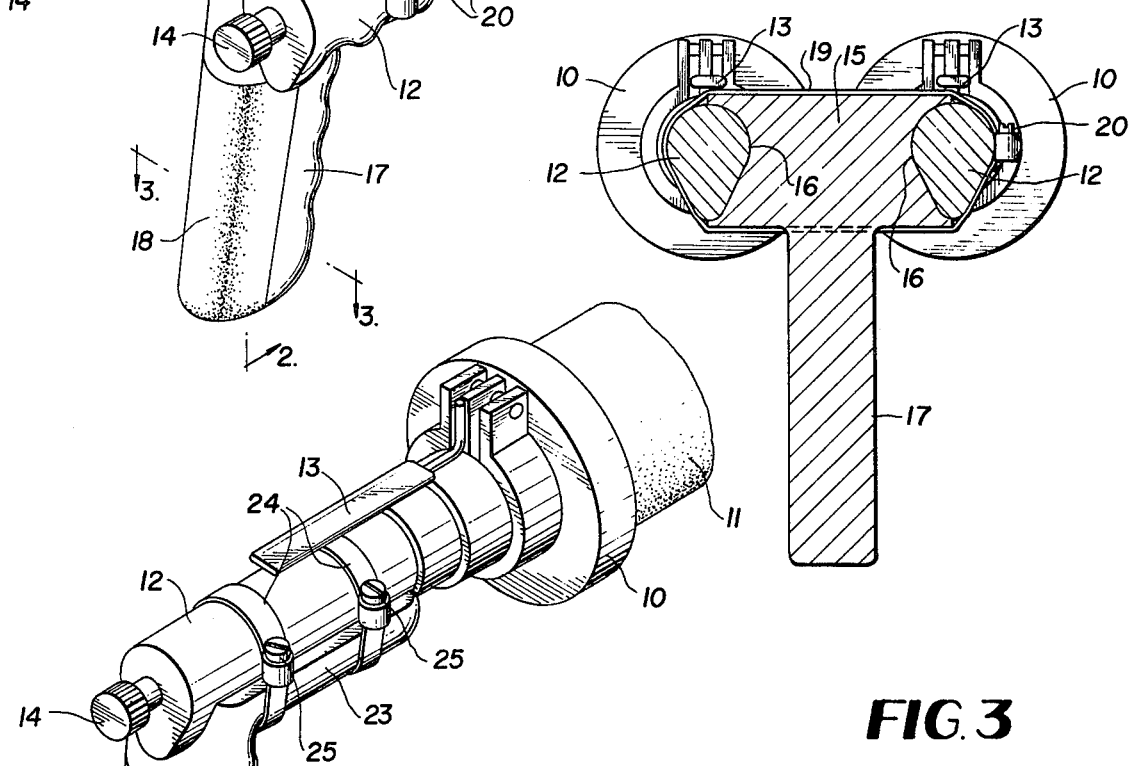

RETRIEVER TRAINING GUN WITH PISTOL TYPE HANDLE

BACKGROUND OF THE INVENTION

Projectile guns for use in training retriever dogs are known in the prior art and one such gun is manufactured according to the teachings of U.S. Pat. No. 3,505,926. The retriever dummy or projectile gun according to this patent is currently marketed by Dogs Unlimited, Box 548, Jackson, Ohio 45640. Additional examples of the known prior art are contained in U.S. Pats. Nos. 3,004,360; 3,415,438; 3,618,244 and 3,717,946.

The commercial gun or dummy thrower according to the above-noted prior patent utilizes a 22 calibre blank cartridge to propel the dummy projectile and the device includes a handle which extends axially or longitudinally behind the cartridge chamber and projectile. A spring-loaded firing pin extends rearwardly of the handle and this pin is operated by one hand of the user while the other hand grips the axial handle. While the arrangement is very safe and the gun performs excellently for throwing retriever training dummies for great distances, the recoil forces generated by the gun render it very uncomfortable to use, and the hand of the user can easily be bruised or injured by the effects of recoil.

In view of the above, the sole objective of this invention is to improve on the above commercial retriever training device by providing thereon an attachment handle formed generally like a pistol hand grip and having resilient padding at least on the portion of the grip which is engaged by the palm and heel of the hand.

By means of the invention, not only is the use of the training gun rendered much more comfortable and the bruising of the hand by recoil forces avoided, but the gun can be held in a more steady and stable manner without interfering with the safe two-handed operation of the gun or dummy thrower.

An additional advantage of the invention is that the use of the improved pistol type hand grip allows the joining of two single projectile guns in side-by-side parallel relationship to form a unitized dual projectile gun with the same advantages of the single projectile type in terms of hand comfort and convenience and efficiency of use. It should be mentioned here that the commercial type gun or thrower to which the invention is applied breaks or hinges at the forward end of the handle for loading with a cartridge and then locks safely with the handle extending axially of the projectile or dummy. The addition of the invention to the assembly does not interfere in any way with this mode of operation, nor does it require altering or defacing of the commercial structure.

Other features and advantages of the invention will become apparent during the course of the following description.

BRIEF DESCRIPTION OF THE DRAWINGS

FIG. 1 is a perspective view of the invention utilized to join a pair of retriever training guns in side-by-side parallel relationship so that dual projectiles can be launched.

FIG. 2 is a transverse vertical section taken on line 2—2 of FIG. 1.

FIG. 3 is a horizontal section taken on line 3—3 of FIG. 1.

FIG. 4 is a perspective view of a second embodiment of the invention wherein the cushioned pistol type hand grip is applied to a single projectile launching gun.

DETAILED DESCRIPTION

Referring to the drawings in detail wherein like numerals designate like parts, and considering first FIGS. 1 to 3, the commercial retriever training gun made in accordance with the teachings of U.S. Pat. No. 3,505,926 comprises a launching head 10 for a training dummy or projectile 11 and having an unpadded handle 12 extending rearwardly of the launching head 10 in coaxial relationship therewith. As disclosed in the above patent, the retriever training gun breaks or hinges at the forward end of the handle 12, somewhat like a shotgun, so that it may be loaded with a blank cartridge. It is locked in the use position shown in the drawings by a locking means 13, as described in the patent. Because the handle 12 is unpadded and extends longitudinally of the firing axis of the dummy or projectile 11, it is quite uncomfortable to hold and the hand of the user can easily become bruised due to the firing recoil forces or "kick". A spring-loaded firing pin 14 is provided on each retriever training gun and while the handle 12 is held in one hand, the pin 14 is pulled rearwardly and released to propel the projectile 11 in the chosen direction. This mode of operation is quite safe since it occupies both hands of the user who will aim the projectile or dummy away from his body.

The above is the construction and mode of operation of the existing prior art retriever training gun.

As shown in FIGS. 1 through 3, the invention serves the dual purpose of cushioning and protecting the hand of the user against firing recoil forces and also enables a pair of the prior art guns to be secured in side-by-side parallel relation as a unit to thereby form a dual projectile gun allowing two projectiles 11 to be fired independently by means of the firing pins 14 while the unit is being held in one hand by the pistol grip handle of the invention.

More particularly, the invention comprises a block-like crosshead 15 formed of wood, cast aluminum, molded plastics, or other suitable material, said crosshead being disposed between the spaced parallel axial handles 12 and being recessed on its opposite sides at 16 to match the profiles of the inner sides of the handles 12 which have a modified tear drop cross sectional shape. Dependingly secured to the crosshead 15 at its transverse center and rear end and preferably formed integral therewith is a pistol-type hand grip 17, preferably arranged at a slight inclination to the vertical, as shown in FIG. 1. At least the rearward side of the hand grip 17 which engages the palm and heel of the hand is padded as at 18 to absorb recoil shock forces generated when the projectiles 11 are fired. The padding 18 can be of any suitable material, such as foam rubber or foam plastics material. The padding 18 can be as thick as necessary to absorb the shock forces.

The crosshead 15, which is rigid, is secured firmly between the two parallel handles 12 of the two guns in FIG. 1 by at least a pair of strong binding straps 19 which completely encircle the two handles 12 and the crosshead 15 ahead of the pistol hand grip 17. The binding straps 19 are preferably metal and they are equipped with adjustable strap end tighteners 20 preferably of the screw-threaded type for security. When the two straps 19 are properly tightened while in spaced parallel relationship transversely of the crosshead 15 and handles 12, the two independent guns become unitized as a single dual projectile gun having a single pistol-type hand grip 17 common to both. While the hand grip 17 is held in one hand by the user, the two firing pins 14 can be pulled and released in succession with the other hand to fire the two dog training dummies or projectiles 11 at desired times and on whatever projectile paths are established by the aiming of the device. The entire assembly is unitized and very secure.

It is to be noted that no alteration, cutting, or defacing of the commercial gun is necessary to install the pistol hand grip attachment of FIG. 1. Whenever desired, the attachment can be removed by merely loosening and removing the screws 20. While the invention is disclosed as an attachment for existing guns, it may also be formed as an integral part of the handles 12 during the manufacturing of a dual projectile gun or launcher. That is to say, the crosshead portion 15 can be formed integrally with the parts of the dual projectile gun which mount the firing pins 14 and are hinged to the heads 10. The convenience and increased comfort afforded by the invention with comparatively little cost increase, as well as other features of the invention, should now be readily apparent to those skilled in the art.

FIG. 4 shows an embodiment of the invention which involves a single retriever training gun only of the type shown in U.S. Pat. No. 3,505,926. This single gun is identical in construction and operation to either of the pair of guns shown and described in connection with FIG. 1.

The depending pistol-type hand grip 21 in FIG. 4 has rear side padding 22 and may be identical in form to the previously-described hand grip 17. Its purposes are the same for cushioning recoil shock forces against the hand while providing a steady support handle for the gun during use. In lieu of the crosshead 15, the hand grip 21 at its top carries a forwardly projecting generally U-cross section rest or support member 23 for the single axial handle 21 of the prior art gun. The rest 23 conforms to the cross sectional roughly tear drop shape of the handle 12. The handle 12 is bound rigidly to the rest 23 by metal straps 24 of the same type previously described and having end terminal adjusting and tightening screw-threaded means 25. The bands 24 completely encircle the rest 23 and axial handle 12 to render the hand grip 21 unitized with the handle 12. The invention also contemplates forming the pistol type hand grip 21 as an integral part of the hand grip 12 during the manufacturing of the basic gun or launcher.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A retriever training device having a projectile and a handle which are coaxial and a spring-urged axial firing pin projecting from the rear end of the handle, a pistol type hand grip for said training device secured fixedly to said handle near the rear end of the handle and depending from the handle, compressible padding on at least the rear side of the pistol type hand grip to absorb firing recoil forces, said pistol type hand grip formed separately as an attachment to said handle, and releasable means detachably securing the pistol type hand grip to said handle, and said pistol type hand grip having an upper end forwardly extending transversely contoured rest extending longitudinally of said handle and beneath the handle and conforming to the cross sectional profile of the lower side of the handle, said releasable means comprising binding strap means encircling said handle and said rest.

2. In a retriever training device having a projectile and a handle which are coaxial and a spring-urged axial firing pin projecting from the rear end of the handle, a pistol type hand grip for said training device secured fixedly to said handle near the rear end of the handle and depending from the handle, and compressible padding on at least the rear side of the pistol type hand grip to absorb firing recoil forces, a second projectile and a second handle which are coaxial in side-by-side parallel relationship to the first-named projectile and handle and also having a spring-urged axial firing pin projecting from the rear end of the second handle, and a crosshead carried by the upper end of said pistol type hand grip and engaged between said first and second handles and fixed thereto, said pistol type hand grip being centered between the first and second handles symmetrically.

3. In a retriever training device as defined in claim 2, and said crosshead extending lengthwise of the first and second handles for the major portions of their lengths and being longitudinally recessed on its opposite sides to conform to the cross sectional profiles of the first-named and second handles.

4. In a retriever training device as defined in claim 3, and releasable means rigidly securing said crosshead to the first-named and second handles to form therewith an integrated unit.

5. In a retriever training device as defined in claim 4, and said releasable means comprising at least a pair of spaced transverse binding straps encircling said crosshead and said first-named and second handles forwardly of said pistol type hand grip.

* * * * *